US010017033B2

(12) United States Patent
Fisher et al.

(10) Patent No.: US 10,017,033 B2
(45) Date of Patent: Jul. 10, 2018

(54) COLD FORMED LAMINATES

(71) Applicant: CORNING INCORPORATED, Corning, NY (US)

(72) Inventors: William Keith Fisher, Suffield, CT (US); Mark Stephen Friske, Campbell, NY (US); Steven Luther Moyer, Lancaster, PA (US); Paul George Rickerl, Endicott, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/204,452

(22) Filed: Jul. 7, 2016

(65) Prior Publication Data

US 2017/0008377 A1 Jan. 12, 2017

Related U.S. Application Data

(60) Provisional application No. 62/339,145, filed on May 20, 2016, provisional application No. 62/281,301, filed on Jan. 21, 2016, provisional application No. 62/190,828, filed on Jul. 10, 2015.

(51) Int. Cl.
*B32B 17/10* (2006.01)
*C03B 23/035* (2006.01)
*B60J 1/00* (2006.01)

(52) U.S. Cl.
CPC ......... *B60J 1/004* (2013.01); *B32B 17/10036* (2013.01); *B32B 17/1088* (2013.01); *B32B 17/10137* (2013.01); *B32B 17/10761* (2013.01); *B32B 17/10816* (2013.01); *B32B 17/10889* (2013.01); *C03B 23/0357* (2013.01); *B32B 2605/006* (2013.01)

(58) Field of Classification Search
None
See application file for complete search history.

(56) References Cited

U.S. PATENT DOCUMENTS

| | | | |
|---|---|---|---|
| 5,077,133 A * | 12/1991 | Cheng | B32B 17/10036 296/84.1 |
| 6,086,983 A | 7/2000 | Yoshizawa | |
| 8,986,072 B2 | 3/2015 | Darcangelo et al. | |
| 9,296,638 B2 | 3/2016 | Lezzi et al. | |
| 2012/0025559 A1 | 2/2012 | Offermann et al. | |
| 2012/0094084 A1 | 4/2012 | Fisher et al. | |
| 2012/0328843 A1 | 12/2012 | Cleary et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson et al. | |
| 2013/0127202 A1 | 5/2013 | Hart | |
| 2013/0295357 A1 | 11/2013 | Cleary et al. | |
| 2013/0319046 A1 | 12/2013 | Cleary et al. | |
| 2013/0323415 A1 | 12/2013 | Brackley et al. | |
| 2014/0087159 A1 | 3/2014 | Cleary et al. | |
| 2014/0087193 A1 | 3/2014 | Cites et al. | |
| 2014/0141206 A1 * | 5/2014 | Gillard | B32B 17/10036 428/174 |
| 2014/0141217 A1 | 5/2014 | Gulati et al. | |
| 2014/0239034 A1 | 8/2014 | Cleary et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0224855 A1 | 8/2015 | Legrand | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Frdholm et al. | |
| 2016/0207290 A1 | 7/2016 | Cleary et al. | |
| 2017/0057205 A1 | 3/2017 | Notsu et al. | |

FOREIGN PATENT DOCUMENTS

| | | |
|---|---|---|
| DE | 102006042538 | 3/2008 |
| FR | 3012073 A1 | 4/2015 |
| GB | 2011316 B | 3/1982 |
| JP | 1991059337 | 9/1991 |
| JP | 2001247342 | 9/2001 |
| JP | 2007197288 | 8/2007 |
| WO | 201531594 | 3/2015 |
| WO | 2015031148 A1 | 3/2015 |
| WO | 2015031151 A1 | 3/2015 |
| WO | 2015054112 A1 | 4/2015 |

OTHER PUBLICATIONS

International Search Report and Written Opinion PCT/US2016/041365 dated Sep. 16, 2016.

* cited by examiner

Primary Examiner — Sheeba Ahmed
(74) Attorney, Agent, or Firm — F. Brock Riggs

(57) ABSTRACT

The principles and embodiments of the present disclosure relate generally to complexly curved laminates made from a complexly curved substrate and a flat substrate, such as automotive window glazings, and methods of cold forming complexly-curved glass products from a curved substrate and a flat substrate. In one or more embodiments, the laminate includes first complexly-curved glass substrate with a first surface and a second surface opposite the first surface, a second complexly-curved glass substrate with a third surface and a fourth surface opposite the third surface with a thickness therebetween; and a polymer interlayer affixed to the second convex surface and third surface, wherein the third surface and fourth surface have compressive stress values respectively that differ such that the fourth surface has as compressive stress value that is greater than the compressive stress value of the third surface.

8 Claims, 3 Drawing Sheets

COLD FORMED LAMINATES

CROSS-REFERENCE TO RELATED APPLICATIONS

This application claims the benefit of priority under 35 U.S.C. § 119 of U.S. Provisional Application Ser. No. 62/339,145 filed on May 20, 2016, U.S. Provisional Application Ser. No. 62/281,301 filed on Jan. 21, 2016 and U.S. Provisional Application Ser. No. 62/190,828 filed on Jul. 10, 2015, the content of which are relied upon and incorporated herein by reference in their entirety.

TECHNICAL FIELD

Principles and embodiments of the present disclosure relate generally to cold-formed complexly curved laminates and methods of cold-forming such laminates.

BACKGROUND

Curved laminates are used in a variety of applications including automotive glazing and architectural windows. For such applications, sheets of glass are precisely bent to defined shapes and/or curvatures determined by the configurations and sizes of the openings, as well as the vehicle style or architectural aesthetics. Such curved laminates may be made by heating flat glass sheets to a suitable temperature for forming, applying forces to the sheet to change the shape, then laminating two curved sheets together. This process is typically referred to as a "hot bending" process. In some known examples, the glass may be heated in a furnace and formed while the sheet is still in a high temperature state (at or near the softening temperature of the glass) within the furnace. Glass sheets may also be bent by initially heating the glass sheet in a furnace to a suitable temperature at or near the softening temperature of the glass, then transferring the glass sheet to a glass bending apparatus outside the furnace. Glass sheets that undergo such bending operations typically have been 2.5 mm, 3 mm, or greater in thickness.

Curved laminates typically must meet stringent optical requirements, and the viewing area of the closures or windows must be free of surface defects and optical distortion that can interfere with the clear viewing through the curved laminate. Glass that is not at an appropriate temperature during a bending operation may exhibit optical distortions, such as roller waves (optical roll distortion) and/or discrete marking(s) and/or defect(s) that may make the bent sheet unsuitable for its intended purpose.

Presently existing methods to form complexly curved laminates presently require heating and bending two glass sheets at or near the softening point of the glass to form a single laminate, and/or typically use very thick glass sheets to facilitate bending operations leading to greater overall weight of the laminate. Moreover, when two glass sheets require differing forming conditions or processes (e.g., due to differing softening points and/or thicknesses), the two glass sheets are typically formed separately and then joined, often leading to shape mismatch and unnecessary processing steps and cost. Accordingly, such methods require complex manufacturing processes incurring longer manufacturing time and more cost.

Automotive glazing and architectural applications are increasingly demanding complexly curved laminates, which are thinner than currently available laminates. Accordingly, there is a need for such laminates that can be shaped and laminated using fewer processing steps and having more precise shape matching.

SUMMARY

A first aspect of this disclosure relates to laminates having complexly curved shapes. In one or more embodiments, the laminates are cold-formed by laminating a flat substrate to a curved substrate. As used herein, "cold-forming" refers to a laminate forming process that is performed at temperature well below the softening temperature of either of the substrates. According to one or more embodiments, the laminate is cold-formed at a temperature at least 200° C. below the softening temperature of either of the substrates. In some embodiments, the cold-formed, complexly curved laminates include a thin substrate (e.g., having a thickness less than about 1 mm), which results in a laminate that has reduced weight. The laminates described herein according to one or more embodiment, exhibit a desirable complexly curved shape, without optical defects and distortions that are often found in known, complexly curved laminates (which are typically formed using a hot bending process).

In one embodiment, a laminate comprises: a first complexly-curved glass substrate having a first surface, a second surface opposite the first surface, and a first thickness therebetween; a second complexly-curved glass substrate having a third surface, a fourth surface opposite the third surface, and a second thickness therebetween; and a polymer interlayer affixed to the second surface and third surface.

In one or more embodiments, either one or both the first complexly-curved glass substrate and the second complexly-curved glass substrate has a thickness in the range of about 0.1 mm to about 1 mm or from about 0.2 mm to about 0.7 mm. In particular, in one or more embodiments, the second complexly curved glass substrate has at thickness less than the first complexly curved glass substrate. In one or more embodiments, the third and fourth surfaces respectively have compressive stress values such that the fourth surface has a compressive stress value that is greater than the compressive stress value of the third surface. In one or more embodiments, the first and third surfaces form convex surfaces while the second and fourth surfaces form concave surfaces.

Another aspect of this disclosure pertains to a method for forming laminates. In one embodiment, a method of producing a complexly-curved laminate, comprises: placing a bonding layer between a complexly curved substrate and a flat, strengthened glass substrate to form a stack; applying pressure to the stack to press the strengthened glass substrate against the bonding layer which is pressed against the complexly curved substrate; and heating the complexly curved substrate, bonding layer, and complexly curved strengthened glass substrate to a temperature below 400° C. to form a complexly-curved laminate in which the strengthened glass substrate conforms in shape to the complexly curved substrate.

The methods described herein do not require heating and bending of both substrates, thus reducing manufacturing time and cost by avoiding heating and bending operations for both of the substrates. In one or more embodiments, the method includes strengthening one substrate chemically, thermally, mechanically or a combination thereof.

In another embodiment, a method of producing a complexly-curved laminate, comprises: forming a first glass substrate having two major surfaces and a thickness therebetween to have a curvature along two axes and to provide a complexly curved glass substrate; arranging the complexly curved glass substrate with a bonding layer and a second glass substrate in a stack such that the bonding layer is between the complexly curved glass substrate and the second glass substrate. In one or more embodiments, the second glass substrate has two major surfaces and a thickness therebetween to have a curvature along two axes, wherein the curvature of the second glass substrate does not match the curvature of the first glass substrate. In one or more embodiments, the method includes applying pressure to the stack at room temperature to shape the second glass substrate to conform to the curvature of the complexly curved glass substrate to form a complexly curved laminate.

Additional features will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
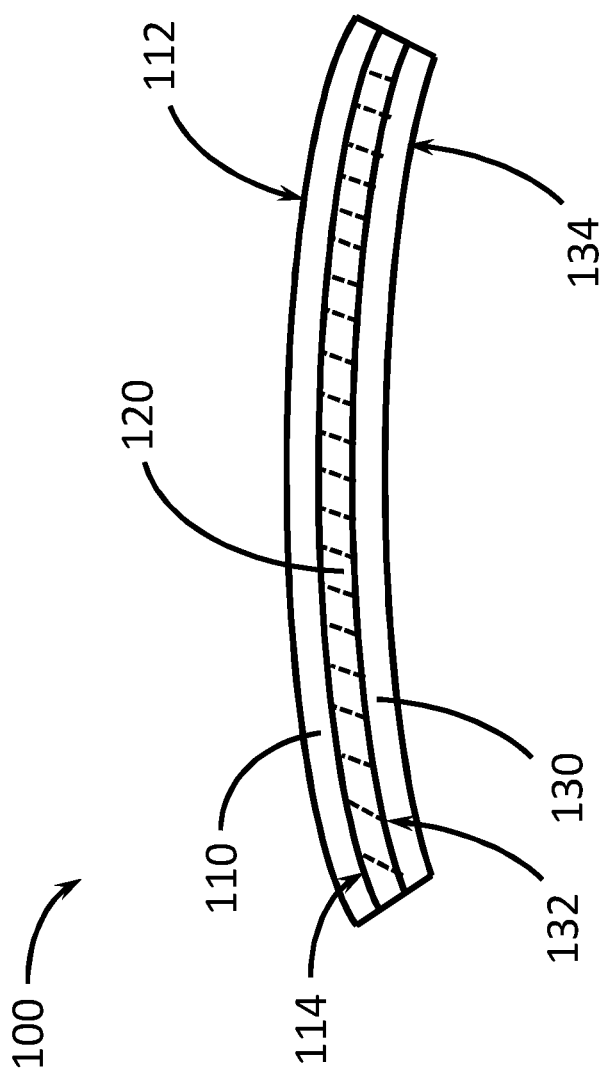
FIG. 1 illustrates a cross-sectional view of an exemplary embodiment of a laminate.

Reference will now be made in detail to various embodiment, examples of which are illustrated in the accompanying drawings.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Automotive and architectural applications often require light-weight yet mechanically strong laminates for various uses. In the automotive field, there is a need to reduce the weight of vehicles to thereby improve fuel efficiency. One approach to reduce the weight of vehicles is to reduce the thickness of laminates and/or substrates used in laminates. There is also a need for laminates with increasingly complexly curved shapes meeting aesthetic requirements. For example, in the automotive field, windshields, backlights, sun-roofs, fix-mounted roof panels, and sidelights are utilizing laminates with complexly curved shapes. In architecture, such complexly curved laminates may be used in various exterior and interior applications (e.g., walls, countertops, appliances, modular furniture, etc.).

The bending requirements of inorganic materials often limit the thickness of the plies used in curved laminates. It has been found that thin glass substrates having a thickness of about 1.5 or 1.4 mm or less can cool too quickly to be curved and formed properly using known hot bending methods, which can result in unacceptable flaws or the laminate breaking during the hot bending operation. In addition, thin glass substrates having a thickness of about 1.5 mm or less can be more prone to distortion if heated to higher temperatures to off-set such cooling. The leading and trailing edges of each glass substrate form a cantilever when the substrate edge is unsupported by a roller bending apparatus. When heated above a particular temperature, a glass substrate (regardless of thickness) can sag under the load of its own cantilevered weight; however such sagging can be greater for thinner substrates and substrates heated to higher temperatures. Such sagging may also occur across the unsupported sections of a substrate between support rollers. One or more of these problems may be addressed by the various embodiments described herein.

A first aspect of the present disclosure is related to a cold-formed laminate having a complexly curved shape. In one or more embodiments, the laminate may be obtained from a first substrate having a complexly curved shape and a second substrate having a flat or planar shape. As used herein, "flat" and "planar" are used interchangeably and mean a shape having curvature less than a curvature at which lamination defects are created due to curvature mismatch, when such a flat substrate is cold-formed to another substrate (i.e., a radius of curvature of greater than or equal to about 3 meters, greater than or equal to about 4 meters or greater than or equal to about 5 meters) or a curvature (of any value) along only one axis. A flat substrate has the foregoing shape when placed on a surface. As used herein "complex curve" and "complexly curved" mean a non-planar shape having curvature along two orthogonal axes that are different from one another. Examples of complexly curved shapes includes having simple or compound curves, also referred to as non-developable shapes, which include but are not limited to spherical, aspherical, and toroidal. The complexly curved laminates according to embodiments may also include segments or portions of such surfaces, or be comprised of a combination of such curves and surfaces. In one or more embodiments, a laminate may have a compound curve including a major radius and a cross curvature. A complexly curved laminate according to embodiments may have a distinct radius of curvature in two independent directions. According to one or more embodiments, complexly curved laminates may thus be characterized as having "cross curvature," where the laminate is curved along an axis (i.e., a first axis) that is parallel to a given dimension and also curved along an axis (i.e., a second axis) that is perpendicular to the same dimension. The curvature of the laminate can be even more complex when a significant minimum radius is combined with a significant cross curvature, and/or depth of bend. Some laminates may also include bending along axes that are not perpendicular to one another. As a non-limiting example, the complexly-curved laminate may have length and width dimensions of 0.5 m by 1.0 m and a radius of curvature of 2 to 2.5 m along the minor axis, and a radius of curvature of 4 to 5 m along the major axis. In one or more embodiments, the complexly-curved laminate may have a radius of curvature of 5 m or less along at least one axis. In one or more embodiments, the complexly-curved laminate may have a radius of curvature of 5 m or less along at least a first axis and along the second axis that is perpendicular to the first axis. In one or more embodiments, the complexly-curved laminate may have a radius of curvature of 5 m or less along at least a first axis and along the second axis that is not perpendicular to the first axis.

FIG. 1 illustrates one embodiment of a laminate 100 including a first substrate 110 having a complexly curved shape and having at least one convex surface provided by a first surface 112 opposite at least one concave surface provided by a second surface 114 with a thickness therebetween. The laminate also includes a second substrate 130 that has been cold-formed and is complexly-curved. The second substrate 130 includes at least one convex surface provided by a third surface 132 opposite at least one concave surface provided by a fourth surface 134, with a thickness therebetween. As shown in FIG. 1, an interlayer 120 may be disposed between the first substrate 110 and the second substrate 130. In one or more embodiments, the interlayer 120 is affixed to at least second surface 114 and the third surface 132 of the laminate. As used herein, the term "convex surface" means outwardly bending or curving as shown in FIG. 1 at reference numbers 112 and 132. The term "concave surface" means inwardly bending or curving as shown in FIG. 1 at reference numbers 114, 134.

In one or more embodiments, prior to the cold-forming process, the respective compressive stresses in the third surface 132 and fourth surface 134 are substantially equal. In embodiments in which the second substrate 130 is unstrengthened (as defined herein), the third surface 132 and the fourth surface 134 exhibit no appreciable compressive stress, prior to cold-forming. In embodiments in which the second substrate 130 is strengthened (as described herein), the third surface 132 and the fourth surface 134 exhibit equal compressive stress with respect to one another, prior to cold-forming. In one or more embodiments, after cold-forming, the compressive stress on the fourth surface 134 increases (i.e., the compressive stress on the fourth surface 134 is greater after cold-forming than before cold-forming). Without being bound by theory, the cold-forming process increases the compressive stress of the substrate being shaped (i.e., the second substrate) to compensate for tensile stresses imparted during bending and/or forming operations. In one or more embodiments, the cold-forming process causes the third surface of that substrate (i.e., the third surface 132) to experience tensile stresses, while the fourth surface of the substrate (i.e., the fourth surface 134) experiences compressive stresses.

When a strengthened second substrate 130 is utilized, the third and fourth surfaces (132, 134) of the second substrate are already under compressive stress, and thus the third surface 132 can experience greater tensile stress. This allows for the strengthened second substrate to conform to more tightly curved surfaces. Thus, for the laminate shown in FIG. 1, after forming of the laminate 100, the third surface 132 has a compressive stress that is less than the compressive stress of the fourth surface 134. In other words, the fourth surface 134 compressive stress is greater than the third surface 132 compressive stress.

In one or more embodiments, the increased compressive stress in the fourth surface 134 (relative to the third surface) provides greater strength to the fourth surface 134, which is an exposed surface after the laminate has been formed.

In one or more embodiments, the second substrate 130 has a thickness less than the first substrate 110. This thickness differential means the second substrate 130 may exert less force and is more flexible to conform to the shape of the first substrate 110. Moreover, a thinner second substrate 130 may deform more readily to compensate for shape mismatches and gaps created by the shape of the first substrate 110. In one or more embodiments, a thin and strengthened second substrate exhibits greater flexibility especially during cold-forming.

In one or more embodiments, the second substrate 130 conforms to the first substrate 110 to provide a substantially uniform distance between the second surface 114 and the third surface 132, which is filled by the interlayer.

In one or more embodiments, the laminate 100 may have a thickness of 6.85 mm or less, or 5.85 mm or less, where the thickness of the laminate 100 comprises the sum of thicknesses of the first substrate 110, the second substrate 130, and the interlayer 120. In various embodiments, the laminate 100 may have a thickness in the range of about 1.8 mm to about 6.85 mm, or in the range of about 1.8 mm to about 5.85 mm, or in the range of about 1.8 mm to about 5.0 mm, or 2.1 mm to about 6.85 mm, or in the range of about 2.1 mm to about 5.85 mm, or in the range of about 2.1 mm to about 5.0 mm, or in the range of about 2.4 mm to about 6.85 mm, or in the range of about 2.4 mm to about 5.85 mm, or in the range of about 2.4 mm to about 5.0 mm, or in the range of about 3.4 mm to about 6.85 mm, or in the range of about 3.4 mm to about 5.85 mm, or in the range of about 3.4 mm to about 5.0 mm.

In one or more embodiments, the laminate 100 exhibits radii of curvature that is less than 1000 mm, or less than 750 mm, or less than 500 mm, or less than 300 mm. The laminate, the first substrate and/or the second substrate are substantially free of wrinkles.

In one or more embodiments the second substrate 130 is relatively thin in comparison to the first substrate. In other words, the first substrate 110 has a thickness greater than the second substrate 130. In one or more embodiments, the first substrate 110 may have a thickness that is more than two times the thickness of the second substrate 130. In one or more embodiments, the first substrate 110 may have a thickness in the range from about 1.5 times to about 2.5 times the thickness of the second substrate 130.

In one or more embodiments, the first substrate 110 and the second substrate 130 may have the same thickness, wherein the first substrate is more rigid or has a greater stiffness than the second substrate, and in very specific embodiments, both the first substrate and the second substrate have a thickness in the range of 0.2 mm and 0.7 mm.

In one or more specific embodiments, the second substrate 130 has a thickness of 0.8 mm or less. In various embodiments, the second substrate 130 may have a thickness in the range of about 0.1 mm to about 1.4 mm, or in the range of about 0.2 mm to about 1.4 mm, or in the range of about 0.3 mm to about 1.4 mm, or in the range of about 0.4 mm to about 1.4 mm, or in the range of about 0.5 mm to about 1.4 mm, or in the range of about 0.1 mm to about 1 mm, or in the range of about 0.2 mm to about 1 mm, or in the range of about 0.1 mm to about 0.7 mm, or in the range of about 0.2 mm to about 0.7 mm, or in the range of about 0.3 mm to about 0.7 mm, or in the range of about 0.4 mm to about 0.7 mm, or in the range of about 0.2 mm to about 0.6 mm, or in the range of about 0.3 mm to about 0.6 mm, or in the range of about 0.4 mm to about 0.6 mm, or in the range of about 0.2 mm to about 0.5 mm, or in the range of about 0.3 mm to about 0.5 mm, or in the range of about 0.2 mm to about 0.4 mm.

In one or more embodiments, the first substrate 110 may have a thickness greater than the second substrate 130. In one or more embodiments, the first substrate 110 has a thickness of 4.0 mm or less, or 3.85 mm or less. In various embodiments, the first substrate may have a thickness in the range of about 1.4 mm to about 3.85 mm, or in the range of about 1.4 mm to about 3.5 mm, or in the range of about 1.4 mm to about 3.0 mm, or in the range of about 1.4 mm to about 2.8 mm, or in the range of about 1.4 mm to about 2.5 mm, or in the range of about 1.4 mm to about 2.0 mm, or in the range of about 1.5 mm to about 3.85 mm, or in the range of about 1.5 mm to about 3.5 mm, or in the range of about 1.5 mm to about 3.0 mm, or in the range of about 1.5 mm to about 2.8 mm, or in the range of about 1.5 mm to about 2.5 mm, or in the range of about 1.5 mm to about 2.0 mm, or in the range of about 1.6 mm to about 3.85 mm, or in the range of about 1.6 mm to about 3.5 mm, or in the range of about 1.6 mm to about 3.0 mm, or in the range of about 1.6 mm to about 2.8 mm, or in the range of about 1.6 mm to about 2.5 mm, or in the range of about 1.6 mm to about 2.0 mm, or in the range of about 1.8 mm to about 3.5 mm, or in the range of about 2.0 mm to about 3.0 mm.

The materials for the first substrate 110 and the second substrate 130 may be varied. According to one or more embodiments, the materials for the first substrate and the second substrate may be the same material or different materials. In exemplary embodiments, one or both of the first substrate and second substrate may be glass (e.g., soda lime glass, alkali aluminosilicate glass, alkali containing borosilicate glass and/or alkali aluminoborosilicate glass) or glass-ceramic. Examples of suitable glass ceramics include $Li_2O$—$Al_2O_3$—$SiO_2$ system (i.e. LAS-System) glass ceramics, $MgO$—$Al_2O_3$—$SiO_2$ system (i.e. MAS-System) glass ceramics, and glass ceramics including crystalline phases of any one or more of mullite, spinel, $\alpha$-quartz, $\beta$-quartz solid solution, petalite, lithium dissilicate, $\beta$-spodumene, nepheline, and alumina. Furthermore, one or both of the first substrate and second substrate can be strengthened chemically, thermally, mechanically or a combination thereof. In one or more embodiments, the first substrate is unstrengthened (which means not strengthened by chemical strengthening, thermal strengthening or mechanical strengthening processes, but may include an annealed substrate) and the second substrate is strengthened. In one or more specific embodiments, the second glass substrate is chemically strengthened.

In one or more embodiments, a laminate may include one or both of the substrates being made of glass or a material other than glass, for example plastic, metal, ceramic, glass-ceramic, wood, and combinations thereof.

The substrates may be provided using a variety of different processes. For instance, where a substrate includes a glass substrate, exemplary glass substrate forming methods include float glass processes and down-draw processes such as fusion draw and slot draw.

A glass substrate prepared by a float glass process may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass substrate that can be lifted from the tin onto rollers. Once off the bath, the glass substrate can be cooled further and annealed to reduce internal stress.

Down-draw processes produce glass substrates having a uniform thickness that possess relatively pristine surfaces. Because the average flexural strength of the glass substrate is controlled by the amount and size of surface flaws, a pristine surface that has had minimal contact has a higher initial strength. Down-drawn glass substrates may be drawn to a thickness of less than about 2 mm.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass substrate. The fusion draw method offers the advantage that, because the two glass films flowing over the channel fuse together, neither of the outside surfaces of the resulting glass substrate comes in contact with any part of the apparatus. Thus, the surface properties of the fusion drawn glass substrate are not affected by such contact.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Once formed, either one of the first substrate or the second substrate may be strengthened to form a strengthened glass substrate. It should be noted that glass ceramic substrates may also be strengthened in the same manner as glass substrates. As used herein, the term "strengthened substrate" may refer to a glass substrate or a glass ceramic substrates that has been strengthened, for example through chemical strengthening (e.g., ion-exchange of larger ions for smaller ions in the surface of the glass or glass ceramic substrate), by thermal strengthening, or mechanical strengthening. In some embodiments, the substrates may be strengthened using a combination of any one or more of chemical strengthening processes, thermal strengthening processes and mechanical strengthening processes.

In one or more embodiments, the strengthened substrates described herein may be chemically strengthened by an ion exchange process. In the ion-exchange process, typically by immersion of a glass or glass ceramic substrate into a molten salt bath for a predetermined period of time, ions at or near the surface(s) of the glass or glass ceramic substrate are exchanged for larger metal ions from the salt bath. In one embodiment, the temperature of the molten salt bath is in the range from about 350° C. to about 430° C. and the predetermined time period is about two hours to about eight hours. The incorporation of the larger ions into the glass or glass ceramic substrate strengthens the substrate by creating a compressive stress (CS) in a near surface region or in regions at and adjacent to the surface(s) of the substrate. A corresponding tensile stress is induced within a central region or regions at a distance from the surface(s) of the substrate to balance the compressive stress. The central region or regions exhibiting a tensile stress are referred to as a central tension (CT) region). Glass or glass ceramic substrates utilizing this strengthening process may be described more specifically as chemically-strengthened or ion-exchanged glass or glass ceramic substrates.

In one example, sodium ions in a glass or glass ceramic substrate are replaced by potassium ions from the molten bath, such as a potassium nitrate salt bath, though other alkali metal ions having larger atomic radii, such as rubidium or cesium, can replace smaller alkali metal ions in the glass. According to particular embodiments, smaller alkali metal ions in the glass or glass ceramic can be replaced by Ag+ ions. Similarly, other alkali metal salts such as, but not limited to, sulfates, phosphates, halides, and the like may be used in the ion exchange process.

The compressive stress is related to the central tension by the following expression (1):

$$CS = CT\left(\frac{t - 2DOL}{DOL}\right)$$

where t is the total thickness of the strengthened glass or glass ceramic substrate and compressive depth of layer (DOL) is the depth of exchange. DOL refers to the depth in the glass or glass ceramic substrate at which compressive stress switches to tensile stress.

Where thermal strengthening is used, the glass or glass ceramic substrates may be heated and then cooled using very high heat transfer rates (h in units of cal/cm$^2$-s-C.°) in a precise manner, with good physical control and gentle handling of the glass. In particular embodiments, the thermal strengthening processes and systems may utilize a small-gap, gas bearing in the cooling/quenching section that allows processing thin glass substrates at higher relative temperatures at the start of cooling, resulting in higher thermal strengthening levels. As described below, this small-gap, gas bearing cooling/quenching section achieves very high heat transfer rates via conductive heat transfer to heat sink(s) across the gap, rather than using high air flow based convective cooling. This high rate conductive heat transfer is achieved while not contacting the glass with liquid or solid material, by supporting the glass substrate on gas bearings within the gap.

In one or more embodiments, the resulting thermally strengthened glass or glass ceramic substrate exhibits higher levels of permanent thermally induced stresses than previously known. Without wishing to be bound by theory, it is believed that the achieved levels of thermally induced stress are obtainable for a combination of reasons. The high uniformity of the heat transfer in the processes detailed herein reduces or removes physical and unwanted thermal stresses in the glass, allowing glass substrates to be tempered at higher heat transfer rates without breaking. Further, the present methods can be performed at lower glass substrate viscosities (higher initial temperatures at the start of quench), while still preserving the desired glass flatness and form, which provides a much greater change in temperature in the cooling process, thus increasing the heat strengthening levels achieved.

In various embodiments, the thermally strengthened glass or glass ceramic substrate have both the stress profiles described herein and a low, as-formed surface roughness. The processes and methods disclosed herein can thermally strengthen the substrates without increasing the surface roughness of the as-formed surfaces. For example, incoming float glass air-side surfaces and incoming fusion formed glass surfaces were characterized by atomic force microscopy (AFM) before and after processing. $R_a$ surface roughness was less than 1 nm (0.6-0.7 nm) for incoming 1.1 mm soda-lime float glass, and the $R_a$ surface roughness was not increased by thermal strengthening according to the present processes. Similarly, an $R_a$ surface roughness of less than 0.3 nm (0.2-0.3) for 1.1 mm sheets of fusion-formed glass was maintained by thermal strengthening according to this disclosure. Accordingly, thermally strengthened glass and glass ceramic substrates according one or more embodiments have a surface roughness on at least a first surface in the range from 0.2 to 1.5 nm $R_a$ roughness, 0.2 to 0.7 nm, 0.2 to 0.4 nm or even such as 0.2 to 0.3 nm, over at least an area of 10×10 μm. Surface roughness may be measured over an area of 10×10 μm in exemplary embodiments, or in some embodiments, 15×15 μm.

In another embodiment, the thermally strengthened glass or glass ceramic substrates described herein have high flatness. In various embodiments, the strengthening system discussed herein utilizes controlled gas bearings to support the glass or glass ceramic substrate during transporting and heating, and in some embodiments, can be used to assist in controlling and/or improving the flatness of the resulting thermally strengthened glass or glass ceramic substrate, resulting in a higher degree of flatness than previously obtainable, particularly for thin and/or highly strengthened glass or glass ceramic substrates. For example, glass or glass ceramic substrates in sheet form having a thickness of about 0.6 mm or greater can be strengthened with improved post-strengthening flatness. The flatness of various embodiments of the thermally strengthened glass or glass ceramic substrate can comprise 100 μm or less total indicator run-out (TIR) along any 50 mm length along one of the first or second surfaces thereof, 300 μm TIR or less within a 50 mm length on one of the first or second surfaces, 200 μm TIR or less, 100 μm TIR or less, or 70 μm TIR or less within a 50 mm length on one of the first or second surfaces. In exemplary embodiments, flatness is measured along any 50 mm or less profile of the thermally strengthened glass or glass ceramic substrates. In contemplated embodiments, the thermally strengthened glass or glass ceramic substrates, which may be in sheet form, with thickness disclosed herein have flatness of 200 μm TIR or less within a 20 mm length on one of the first or second surfaces (e.g., flatness of 100 μm TIR or less, flatness 70 μm TIR or less, or flatness 50 μm TIR or less).

According to contemplated embodiments, the thermally strengthened glass or glass ceramic substrates according to one or more embodiments have a high-degree of dimensional consistency such that the thickness t thereof along a 1 cm length or width does not change by more than 50 μm, such as, by not more than 10 μm, not more than 5 μm, not more than 2 μm. Such dimensional consistency may not be achievable for given thicknesses, areas, and/or magnitudes of negative tensile stress, as disclosed herein, by solid quenching due to practical considerations, such as cooling plate alignment and/or surface irregularities that may distort the dimensions.

According to contemplated embodiments, the thermally strengthened glass or glass ceramic substrates according to one or more embodiments have at least one surface that is flat such that a 1 cm lengthwise profile therealong stays within 50 μm of a straight line, such as within 20 μm, 10 μm, 5 μm, 2 μm; and/or a 1 cm widthwise profile therealong stays within 50 μm of a straight line, such as within 20 μm, 10 μm, 5 μm, 2 μm. Such high flatness may not be achievable for given thicknesses, areas, and/or magnitudes of negative tensile stress, as disclosed herein, by liquid quenching due to practical considerations, such as warping or bending of the glass strengthened in these processes due to convective currents and associated forces of the liquid.

In various embodiments, the thermally strengthened glass or glass ceramic substrates according to one or more embodiments have high fictive temperatures. It will be understood that in various embodiments, high fictive temperatures relate to the high level of thermal strengthening, high central tensile stresses and/or high compressive surface stress of the resulting glass or glass ceramic substrate. Surface fictive temperatures may be determined by any suitable method, including differential scanning calorimetry, Brillouin spectroscopy, or Raman spectroscopy.

According to an exemplary embodiment, the thermally strengthened glass or glass ceramic substrates according to one or more embodiments has a portion thereof, such as at or near the surfaces, that has a particularly high fictive temperature, such as at least 500° C., such as at least 600° C., or even at least 700° C. In some embodiments, the glass or glass ceramic substrate that exhibits such fictive temperatures may include a soda-lime glass. According to an exemplary embodiment, the thermally strengthened glass or glass ceramic substrates according to one or more embodiments has a portion thereof, such as at or near the surfaces, that has a particularly high fictive temperature relative to annealed glass of the same chemical composition. For example, in some embodiments, the thermally strengthened glass or glass ceramic substrates exhibit a fictive temperature that is least 10° C. greater, at least 30° C. greater, at least 50° C. greater, at least 70° C. greater, or even at least 100° C. greater than the fictive temperature of an annealed glass of the same chemical composition (i.e., a glass that is and has not been thermally strengthened according to the process described herein). High fictive temperature may be achieved by a rapid transition from the hot to the cooling zones in the thermal strengthening system. Without being bound by theory, thermally strengthened glass or glass ceramic substrates with high fictive temperature exhibit increased damage resistance.

In some methods of determining surface fictive temperatures, it may be necessary to break the thermally strengthened glass or glass ceramic substrate to relieve the "temper stresses" induced by the heat strengthening process in order to measure fictive temperature with reasonably accuracy. It is well known that characteristic structure bands measured by Raman spectroscopy shift in a controlled manner both with respect to the fictive temperature and with respect to applied stress in silicate glasses. This shift can be used to non-destructively measure the fictive temperature if the temper stress is known. The method of determining fictive temperature is described in U.S. Provisional Patent Application No. 62/236,296, entitled "THERMALLY STRENGTHENED GLASS AND RELATED SYSTEMS AND METHODS", filed on Oct. 2, 2015, the content of which is incorporated herein, in its entirety, by reference.

The following non-dimensional fictive temperature parameter θ can be used to compare the relative performance of a thermal strengthening process in terms of the fictive temperature produced. Given in terms of surface fictive temperature θs in this case:

$$\theta s = (T_{fs} - T_{anneal})/(T_{soft} - T_{anneal}) \quad (2)$$

where $T_{fs}$ is the surface fictive temperature, $T_{anneal}$ (the temperature of the glass at a viscosity of $\eta=10^{13.2}$ Poise) is the annealing point and $T_{soft}$ (the temperature of the glass at a viscosity of $\eta=10^{7.6}$ Poise) is the softening point of the glass of the sheet. FIG. 10 is a plot of θs for measured surface fictive temperatures as a function of heat transfer rate, h, applied during thermal strengthening for two different glasses. In one or more embodiments, a thermally strengthened glass or glass ceramic comprises a glass having a softening temperature, expressed in units of ° C., of $T_{soft}$ and an annealing temperature, expressed in units of ° C., of $T_{anneal}$, and a surface fictive temperature measured on the first surface of the glass sheet represented by Tfs, when expressed in units of ° C. and a non-dimensional surface fictive temperature parameter θs given by $(Tfs-T_{anneal})/(T_{soft}-T_{anneal})$, wherein the parameter θs is in the range of from 0.20 to 0.9. In embodiments, parameter θs comprises from about (e.g., plus or minus 10%) 0.21 to 0.09, or 0.22 to 0.09, or 0.23 to 0.09, or 0.24 to 0.09, or 0.25 to 0.09, or 0.30 to 0.09, or 0.40 to 0.09, or 0.5 to 0.9, or 0.51 to 0.9, or 0.52 to 0.9, or 0.53 to 0.9, or 0.54 to 0.9, or 0.54 to 0.9, or 0.55 to 0.9, or 0.6 to 0.9, or even 0.65 to 0.9.

At higher thermal transfer rates (such as at about 800 W/m²K and above, for example), however, the high temperature or "liquidus" CTE of the glass begins to affect tempering performance. Therefore, under such conditions, the temperability parameter Ψ, based on an approximation of integration over the changing CTE values across the viscosity curve, is found to be useful:

$$\Psi = E \cdot [T_{strain} \cdot \alpha_{CTE}^s + \alpha_{CTE}^L \cdot (T_{soft} - T_{strain})] \quad (3)$$

where $\alpha^S_{CTE}$ is the low temperature linear CTE (equivalent to the average linear expansion coefficient from 0-300° C. for the glass), expressed in 1/° C. (° C.$^{-1}$), $\alpha^L_{CTE}$ is the high temperature linear CTE (equivalent to the high-temperature plateau value which is observed to occur somewhere between the glass transition and softening point), expressed in 1/° C. (° C.$^{-1}$), E is the elastic modulus of the glass, expressed in GPa (not MPa) (which allows values of the (non-dimensional) parameter Ψ range generally between 0 and 1), $T_{strain}$ is the strain point temperature of the glass, (the temperature of the glass at a viscosity of $\eta=10^{14.7}$ Poise) expressed in ° C., and $T_{soft}$ is the softening point of the glass (the temperature of the glass at a viscosity of $\eta=10^{7.6}$ Poise), expressed in ° C.

The thermal strengthening process and resulting surface CS values were modeled for glasses having varying properties to determine the tempering parameter, Ψ The glasses were modeled at the same starting viscosity of $10^{8.2}$ Poise and at varying heat transfer coefficients. The properties of the various glasses are shown in Table 1, together with the temperature for each glass at $10^{8.2}$ Poise and the calculated value of the temperability parameter for each.

TABLE 1

| Glass | Modulus | CTE low | CTE high | $10^{8.2}$ Poise ° C. | Softening Point (° C.) | Strain Point (° C.) | Ψ |
|---|---|---|---|---|---|---|---|
| SLG | 72 | 8.8 | 27.61 | 705 | 728 | 507 | 0.76 |
| 2 | 73.3 | 8.53 | 20.49 | 813 | 837 | 553 | 0.77 |
| 3 | 65.5 | 8.26 | 26 | 821 | 862 | 549 | 0.83 |
| 4 | 65 | 8.69 | 20.2 | 864 | 912 | 608 | 0.74 |
| 5 | 63.9 | 10.61 | 22 | 849 | 884 | 557 | 0.84 |
| 6 | 58.26 | 3.5 | 20.2 | 842 | 876 | 557 | 0.49 |
| 7 | 73.6 | 3.6 | 13.3 | 929 | 963 | 708 | 0.44 |
| 8 | 81.1 | 3.86 | 12.13 | 968 | 995 | 749 | 0.48 |

The results in Table 2 show that Ψ is proportional to the thermal strengthening performance of the glass. In another aspect, it has been found that for any glass, at any given value of the heat transfer coefficient, h (expressed in cal/cm²-s-° C.), the curves of surface CS ($\sigma_{CS}$, in MPa) vs.

thickness (t, in mm) can be fit (over the range of t from 0 to 6 mm) by the hyperbola, where $P_1$ and $P_2$ are functions of h such that:

$$\sigma_{CS}(Glass, h, t) = C(h, t) * \Psi(Glass) = \frac{P_1(h) * t}{(P_2(h) + t)} * \Psi(Glass) \quad (4)$$

or with the expression for $\Psi$ substituted in, the curve of CS $\sigma_{CS}$ (Glass,h,t) is given by:

$$\frac{P_1(h) * t}{(P_2(h) + t)} \cdot E \cdot [T_{strain} \cdot \alpha_{CTE}^s + \alpha_{CTE}^L \cdot (T_{soft} - T_{strain})] \quad (5)$$

where the constants $P_1$, $P_2$, in either (4) or (5) above, are each continuous functions of the heat transfer value, h, given by:

$$P_1 = 910.2 - 259.2 \cdot \exp\left(-\frac{h}{0.143}\right) \quad (6)$$

and $$P_2 = 2.53 + \frac{23.65}{\left(1 + \left(\frac{h}{0.00738}\right)^{1.58}\right)} \quad (7)$$

In some embodiments, a similar expression may be used to predict the CT of a thermally strengthened glass sheet, particularly at a thickness of 6 mm and less, and the thermal transfer coefficient, such as 800 W/m²K and up, by simply dividing the CS predicted under the same conductions by 2. Thus, expected CT may be given by $$\frac{P_{1CT}(h_{CT}) * t}{(P_{2CT}(h_{CT}) + t)} \cdot E \cdot [T_{strain} \cdot \alpha_{CTE}^s + \alpha_{CTE}^L \cdot (T_{soft} - T_{strain})] \quad (8)$$

Where $P_{1CT}$ and $P_{2CT}$ are given as follows:

$$P_{1CT} = 910.2 - 259.2 \cdot \exp\left(-\frac{h_{CT}}{0.143}\right) \quad (9)$$

and $$P_{2CT} = 2.53 + \frac{23.65}{\left(1 + \left(\frac{h_{CT}}{0.00738}\right)^{1.58}\right)} \quad (10)$$

In some embodiments, h and $h_{CT}$, may have the same value for a given physical instance of thermal strengthening. However, in some embodiments, they may vary, and providing separate variables and allowing variation between them allows for capturing, within descriptive performance curves, instances in which the typical ratio of 2:1 CS/CT does not hold.

One or more embodiments of the currently disclosed processes and systems have produced thermally strengthened SLG sheets at all of the heat transfer rate values (h and $h_{CT}$) shown in Table 2.

TABLE 2 h and $h_{CT}$ values according to exemplary embodiments

| cal/s · cm² · ° C. | W/m2K |
| --- | --- |
| 0.010 | 418.68 |
| 0.013 | 544.284 |
| 0.018 | 753.624 |
| 0.019 | 795.492 |
| 0.020 | 837.36 |
| 0.021 | 879.228 |
| 0.022 | 921.096 |
| 0.023 | 962.964 |
| 0.027 | 1130.436 |
| 0.028 | 1172.304 |
| 0.029 | 1214.172 |
| 0.030 | 1256.04 |
| 0.031 | 1297.908 |
| 0.033 | 1381.644 |
| 0.034 | 1423.512 |
| 0.038 | 1590.984 |
| 0.040 | 1674.72 |
| 0.041 | 1716.588 |
| 0.042 | 1758.456 |
| 0.045 | 1884.06 |
| 0.047 | 1967.796 |
| 0.048 | 2009.664 |
| 0.049 | 2051.532 |
| 0.050 | 2093.4 |
| 0.051 | 2135.268 |
| 0.052 | 2177.136 |
| 0.053 | 2219.004 |
| 0.054 | 2260.872 |
| 0.055 | 2302.74 |
| 0.060 | 2512.08 |
| 0.061 | 2553.948 |
| 0.062 | 2595.816 |
| 0.063 | 2637.684 |
| 0.065 | 2721.42 |
| 0.067 | 2805.156 |
| 0.069 | 2888.892 |
| 0.070 | 2930.76 |
| 0.071 | 2972.628 |
| 0.078 | 3265.704 |
| 0.080 | 3349.44 |
| 0.081 | 3391.308 |
| 0.082 | 3433.176 |
| 0.095 | 3977.46 |
| 0.096 | 4019.328 |
| 0.102 | 4270.536 |
| 0.104 | 4354.272 |
| 0.105 | 4396.14 |
| 0.127 | 5317.236 |
| 0.144 | 6028.992 |
| 0.148 | 6196.464 |
| 0.149 | 6238.332 |
| 0.184 | 7703.712 |

In some embodiments, the heat transfer value rates (h and $h_{CT}$) may be from about 0.024 to about 0.15, about 0.026 to about 0.10, or about 0.026 to about 0.075 cal/s·cm²·° C.

In one or more embodiments, the strengthened glass or glass ceramic substrate may be mechanically strengthened by utilizing a mismatch of the coefficient of thermal expansion between portions of the substrate to create compressive stress and central tension regions.

In one embodiment, a strengthened glass or glass ceramic substrate can have a surface CS of 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. In one or more embodiments, the surface CS is the maximum CS in the strengthened glass or glass ceramic substrate.

The strengthened glass or glass ceramic substrate may have a DOL of about 15 μm or greater, 20 μm or greater (e.g., 25 µm, 30 µm, 35 µm, 40 µm, 45 µm, 50 µm or greater). In one or more embodiments, the strengthened glass or glass ceramic substrate may exhibit a maximum CT value of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less).

In one or more specific embodiments, the strengthened glass or glass ceramic substrate has one or more of the following: a surface compressive stress greater than 300 MPa, a depth of compressive layer greater than 15 µm, and a central tension greater than 18 MPa.

Examples of glasses that may be used in the substrate may include alkali aluminosilicate glass compositions or alkali aluminoborosilicate glass compositions, though other glass compositions are contemplated. One example glass composition comprises $SiO_2$, $B_2O_3$ and $Na_2O$, where ($SiO_2$+$B_2O_3$)≥ 66 mol. %, and $Na_2O$≥9 mol. %. In an embodiment, the glass composition includes at least 6 wt. % aluminum oxide. In a further embodiment, the substrate includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤($Li_2O$+$Na_2O$+$K_2O$)≤20 mol. % and 0 mol. %≤(MgO+CaO)≤10 mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤($Li_2O$+$Na_2O$+$K_2O$)≤18 mol. % and 2 mol. %≤(MgO+CaO)≤7 mol. %.

In a particular embodiment, an alkali aluminosilicate glass composition suitable for the substrate comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio (($Al_2O_3$+$B_2O_3$)/Σmodifiers)>1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio (($Al_2O_3$+$B_2O_3$)/Σmodifiers)>1.

In still another embodiment, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)–$Al_2O_3$≤2 mol. %; 2 mol. %≤$Na_2O$–$Al_2O_3$≤6 mol. %; and 4 mol. %≤($Na_2O$+$K_2O$)–$Al_2O_3$≤10 mol. %.

In an alternative embodiment, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

In some embodiments, the compositions used for a glass substrate may be batched with 0-2 mol. % of at least one fining agent selected from a group that includes $Na_2SO_4$, NaCl, NaF, NaBr, $K_2SO_4$, KCl, KF, KBr, and $SnO_2$.

In one or more embodiments, the interlayer 120 comprises a material selected from the group consisting of polyvinyl butyral (PVB) resin, ethylenevinylacetate copolymer (EVA), ionomers, polyvinyl chloride copolymers and thermoplastic polyurethanes (TPUs). The thickness of the interlayer may be in the range from about 0.3 mm to about 2 mm.

In one or more embodiments, the laminate may have a length and width in the range of 30.5 cm by about 30.5 cm (12 in.×12 in.) to about 50.8 cm by 101.6 cm (20 in.×40 in.), or to about 121.9 cm by 127 cm (48 in.×50 in), or to about 127 cm by 183 cm (50 in.×72 in.). While the laminates have been described in terms of two dimensions, it should be understood that laminates may have various shapes, including quadrilaterals (e.g., rectangular, square, trapezoid, etc.), triangles having dimensions in two directions, for example along two different sides or axis of a plane, or may have non-rectangular shapes (e.g., circular, elliptical, oval, polygonal, etc.) that may be described in terms of a radius and/or the length of major and minor axis, where the non-rectangular shapes may be related to a rectangular shape corresponding to the two largest dimensions in perpendicular directions, for example, as it would be measured to be cut out of a rectangular substrate. The substrates may be suitably configured and dimensioned to laminates of an intended size.

In one or more embodiments, the laminate may have additional coating or layers applied to the exposed surfaces, including but not limited to tints, anti-reflection coatings, anti-glare coatings, scratch resistant coatings, etc. In one or more embodiments, the polymer interlayer can be modified to have one or more of the following properties: ultraviolet (UV) absorption, Infrared (IR) absorption, IR reflection and tint. The polymer interlayer can be modified by a suitable additive such as a dye, a pigment, dopants, etc. to impart the desired property.

Figure 2:
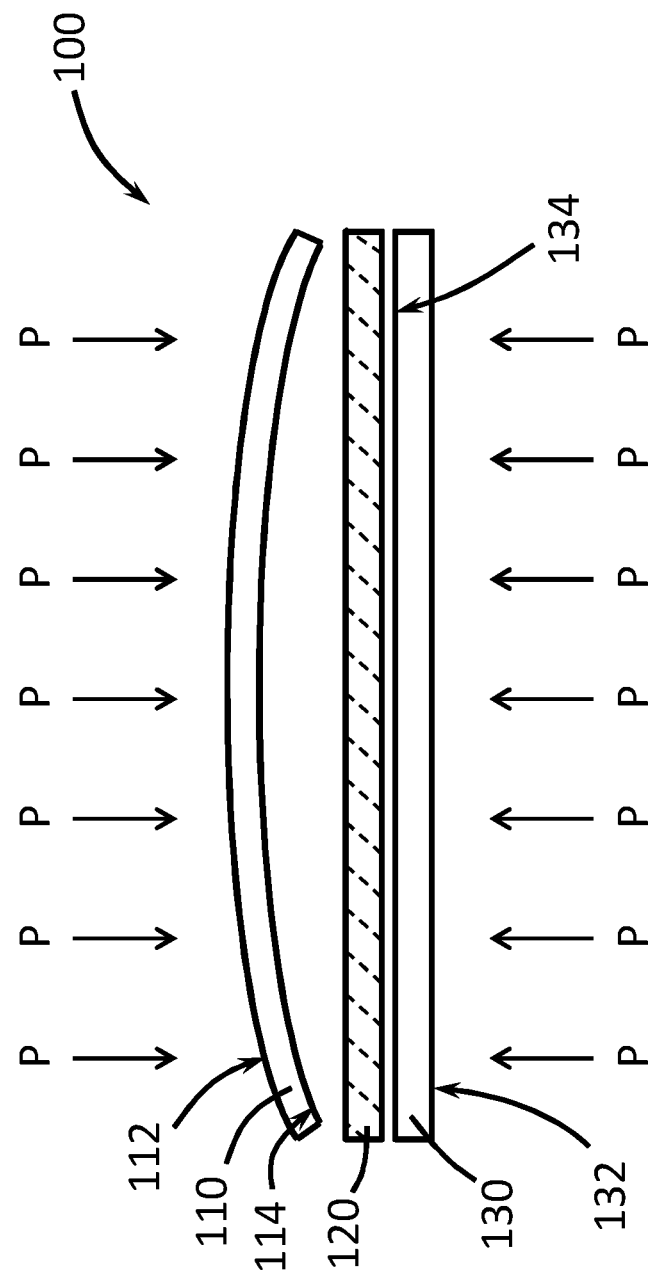
FIG. 2 illustrates a cross-sectional view of an exemplary embodiment of a flat glass substrate, a curved glass substrate and an intervening film layer before shaping.

A second aspect of this disclosure pertains to methods of cold-forming the laminates described herein. FIG. 2 illustrates a cross-sectional view of an exemplary embodiment of the first substrate 110, the interlayer 120, and the second substrate 130 before cold-forming.

First substrate 110 is arranged in a stack with interlayer 120 and the second substrate 130. As shown in FIG. 2, the second substrate 130 is flat prior to the forming process. In various embodiments, during a cold-forming process, pressure is applied to the stack such that the second substrate 130, the interlayer 120, and the first substrate 110 are pressed together by applying pressure to the stack as shown by the arrows "P" in FIG. 2. In one or more embodiments, the pressure may be about 1 atmosphere or greater. In one or more alternative embodiments, the pressure applied may be about 1 atmosphere or less. As described further below, heat may be applied at a temperature below the forming temperature of the second substrate 130. The second substrate 130 deforms to take on the shape of the first substrate 110 and the first substrate 110 and the second substrate are bonded together by the interlayer 120. The second substrate 130, first substrate 110 having the complexly curved shape, and interlayer 120 are thus laminated together by the cold-forming process to form the laminate 100, as shown in FIG. 1. In one or more embodiments, the first glass substrate 110 could also be annealed or thermally tempered.

In one or more embodiments, the first and second substrates may be stacked, aligned, and introduced into the cold-forming apparatus at the same time. The multiple substrates may then be shaped and cold-formed together at one time by the bending apparatus.

In one or more embodiments, the method includes hot forming the first substrate to a complexly curved shape prior to cold-forming the first substrate and the second substrate into one or more embodiments of the laminates described herein. In one or more embodiments, hot forming the first substrate may include heating the first substrate to a temperature near the softening point of the substrate and then bending the heated first substrate to the complexly curved shape. In one or more embodiments, the first substrate is a glass substrate and hot forming the first substrate includes heating the first substrate to a temperature near the softening point, e.g., above 400° C.

In one or more embodiments, the complexly curved first substrate and the flat second substrate are cold-formed into a laminate at a temperature well below the softening point of the second substrate. In one or more embodiments, the cold-forming process occurs at a temperature that is 200° C. or more below the softening point of the substrate. Softening point refers to the temperature at which glass will deform under its own weight. In one or more specific embodiments, the temperature during the cold-forming process is below about 400° C., below about 350° C., below about 300° C., below about 200° C., below about 175° C. or below about 150° C. In one specific embodiment the cold-forming process is in the range of room temperature to about 140° C. Room temperature can be considered to be the ambient temperature of a production floor (e.g., 16° C. to about 35° C.).

In one or more embodiments, the method includes disposing an interlayer between a complexly curved first substrate and a flat second substrate, and cold-forming the substrates so that the flat substrate becomes complexly curved, while simultaneously bonding the two substrates together via the interlayer. In one or more embodiments, the method includes bonding the first and second substrates together via the interlayer in a separate step from the cold-forming step in which the flat second substrate is shaped to conform to the first substrate. In various embodiments, the bonding step includes heating the stack of the first substrate, the interlayer and the second substrate to a temperature in the range of about 100° C. to about 140° C. to form a bond between the substrates and the interlayer. In one or more embodiments, the method may include the use of an adhesive in addition to or instead of the interlayer to bond the substrates together.

In one or more embodiments, the method does not include bonding the first and second substrates. In such embodiments, the complexly curved first substrate and the flat second substrate are stacked and aligned together, and pressed together to shape the second substrate into a complexly curved shape that conforms to the shape of the first substrate. The two substrates are then separated and used individually.

In one or more embodiments, during the cold-forming process, the second substrate deforms to fit against a second surface 114 of the first substrate and a peripheral portion of the second substrate exerts a compressive force against the interlayer (when present) and first substrate due to the desire to flex back to a flatter state. A center portion of the second substrate exerts a tensile force against the interlayer (when present) and the first substrate as it attempts to pull away from the interlayer to flex back to a flatter state to relieve at least a portion of tensile stress.

The embodiments of the method described herein enable higher manufacturing yields because the second substrate can have a large range of shapes and still be successfully cold-formed to the first substrate. According to one or more embodiments, where the second substrate is glass, the methods described herein overcome shape mismatch that can occur during glass forming and result in a laminate having a desirable and repeatable shape, even when the second substrate lacks shape uniformity.

In one or more embodiments, the cold-forming process may be performed on a press-bending apparatus comprising a male mold form and a female mold form. In various embodiments, the second substrate may be supported by the female mold form, and provides a hollow space in at least a middle portion to receive a portion of the second substrate during a forming operation. In various embodiments, the female bending form and the male bending form are configured to engage each other to cold-form the second substrate and first substrate into the laminate.

In various embodiments, a vacuum technique may be used to cold-form the first and second substrates into the laminates described herein. Suitable vacuum techniques include a vacuum bag technique or vacuum rings and can also be used. In alternative embodiments, flat bed clam shell type laminating machine can be used.

In a vacuum bag technique, the first substrate, the second substrate and, optionally, the interlayer, may be stacked and aligned and placed in a suitable bag. The air is extracted from the bag until the atmospheric pressure surrounding the bag applies a force of approximately one atmosphere (i.e., taking into account elevation/geographical location, and limits of the vacuum apparatus to evacuate all the air, etc.). In various embodiments, the force applied causes the second substrate to cold-form to the complexly curved first substrate.

A third aspect of this disclosure relates to a vehicle including a body having an opening and one or more embodiments of the laminates disclosed herein disposed in the opening. The vehicle may include an automobile, a heavy duty truck, sea craft, rail cars, air craft, and the like. The laminate may be movable with respect to the opening.

A fourth aspect of this disclosure pertains to a vehicle having a body defining an interior cabin, wherein the interior cabin comprises a surface formed from one or more laminates described herein. In one or more embodiments, the surface forms at least a portion of the dashboard, floorboard, door panel, center console, instrument panels, display panel, head rest, pillar and the like.

EXAMPLES

Principles and embodiments of the disclosure are exemplified by the following non-limiting examples.

Examples using methods described herein were prepared by laminating a flat, chemically strengthened substrate (formed from an alkali aluminosilicate glass) to a complexly curved unstrengthened substrate (formed from soda lime glass (SLG)) having a thickness greater than the flat, chemically strengthened substrate. The resulting laminates included a trilayer acoustic polyvinyl butyrate interlayer between the substrates. The laminate was also formed using a vacuum technique with either vacuum bags or vacuum channel de-airing and a standard autoclave processes.

Example 1

Figure 3:
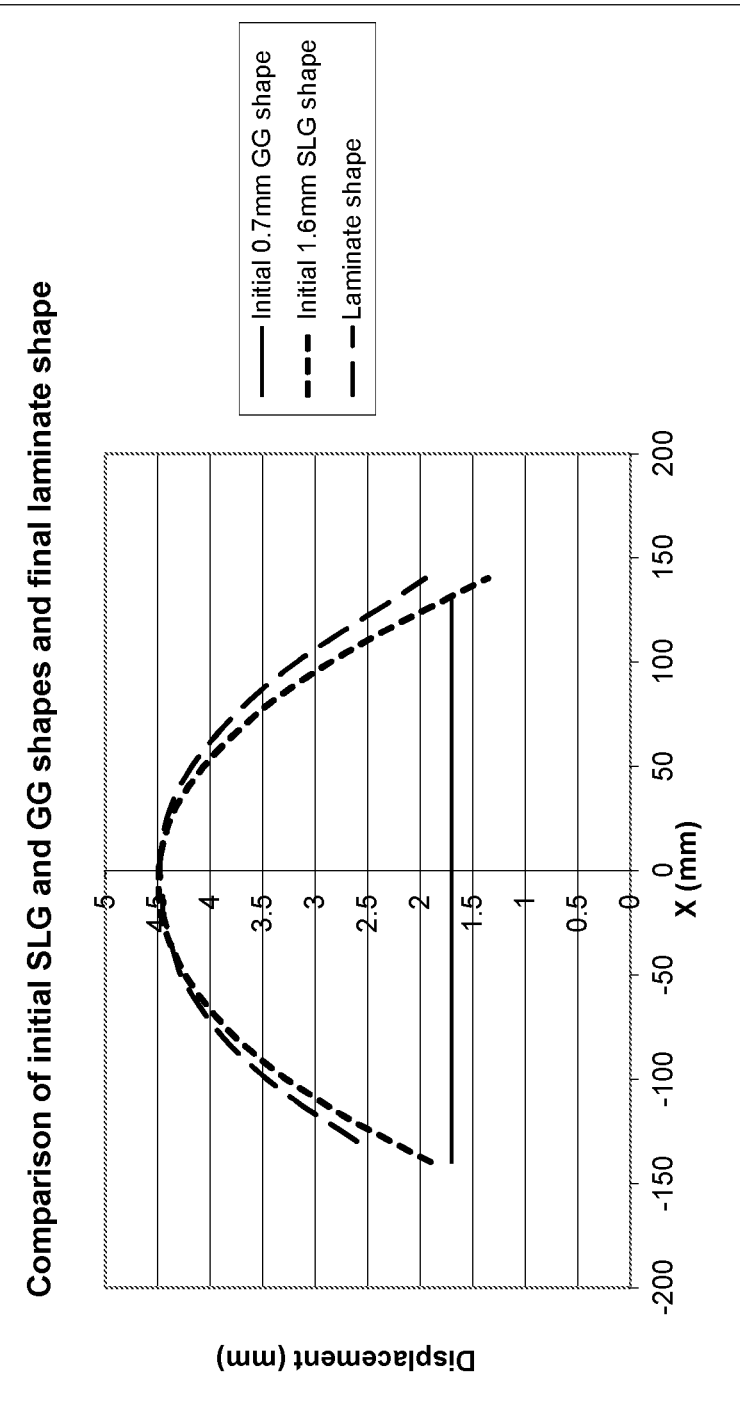
FIG. 3 is a graph showing laminate shape for a laminate according an embodiment of the disclosure.

A glass substrate having a diameter of 355.6 mm and thickness of 0.7 mm formed from an aluminosilicate glass composition (labeled "GG") was assembled in a stack with a glass substrate having the same diameter and a thickness of 1.6 mm formed from a SLG (labeled "SLG"). The 1.6 mm thick substrate had a spherical and thus complexly curved shape. The stack was placed in a vacuum bag which was then placed in an autoclave such that the 0.7 mm-thick substrate was cold-formed to the 1.6 mm-thick substrate. The shape of the substrates and the resulting laminate were measured by a confocal sensor available from Micro-Epsilon used in conjunction with a general motion platform. In each instance, the substrate (before lamination) or laminate was placed on the general motion platform. The platform controls and monitors x-y position. The confocal sensor measures displacement of the substrate (before lamination) or laminate from the plane of the platform. A map of displacement from the platform vs. x-y position defines the shape of the substrate (before lamination) or laminate. FIG. 3 is a graph of the measurement results. After lamination, both substrates had identical shapes, demonstrating that an initially flat substrate can conform to the shape of a thicker, more rigid substrate having a spherical shape.

Example 2

A flat substrate having length, width and thickness dimensions of 237 mm×318 mm×0.7 mm including an aluminosilicate glass composition was assembled in a stack with a complexly curved substrate. The complexly curved substrate had the same length and width dimensions as the flat substrate but had a thickness of 2.1 mm and included an SLG composition. The 2.1 mm-thick substrate exhibited a center sag depth (the total depth of curvature from the edges to the center) was 6.75 mm. The stack was placed in a vacuum bag so the flat substrate was cold-formed to the complexly curved shape of the SLG substrate. The optical properties of the resulting laminate was measured using transmitted optics according to ASTM Standard C1036-06 viewing a "zebra board" through the laminate at various angles. The zebra board consisted of a series of black and white diagonal strips (i.e., the black stripes are 25 mm wide separated by 25 mm wide white stripes). The quality of transmitted optics is evaluated by observing the degree of distortion of the stripes when viewed through the laminate. The transmitted optical distortion in the central clear area showed no sign of degradation due to the cold-forming process. Small levels of distortion were detected on the periphery of the laminate, but were not visible to the naked eye due to the decoration band on the periphery.

Example 3

A flat substrate having length, width and thickness dimensions of 237 mm×318 mm×0.55 mm and including an aluminosilicate glass composition was assembled with a complexly curved substrate. The complexly curved substrate had the same length and width dimensions as the flat substrate but had a thickness of 1.6 mm and included a SLG composition. The 1.6 mm-thick substrate exhibited a center sag depth (the total depth of curvature from the edges to the center) was 6.75 mm. The stack was placed in a vacuum bag so the flat substrate was cold-formed to the complexly curved shape of the SLG substrate. The optical properties of the resulting laminate were measured using transmitted optics in the same manner as Example 2. The transmitted optical distortion in the central clear area showed no sign of degradation due to the cold-forming process. Small levels of distortion were detected on the periphery of the laminate, but were not visible to the naked eye due to the decoration band on the periphery.

Example 4

A flat substrate having length, width and thickness dimensions of 1350 mm×472 mm×0.7 mm and including an aluminosilicate glass composition was assembled with a complexly curved substrate having the same length and width dimensions as the flat substrate but a thickness of 3.85 mm and including a SLG composition. The stack was placed in a vacuum bag so the flat substrate was cold-formed to the complexly curved shape of the SLG substrate. The optical properties of the resulting laminate were measured using transmitted optics in the same manner as Example 2. No sign of degradation due to the cold-forming process was shown.

In a first embodiment, the disclosure provides a laminate comprising: a first complexly-curved glass substrate having a first surface, a second surface opposite the first surface, and a first thickness therebetween; a second complexly-curved glass substrate having a third surface, a fourth surface opposite the third surface, and a second thickness therebetween; and a polymer interlayer affixed to the second surface and third surface, wherein one of the first thickness and the second thickness is in the range of about 0.2 mm to about 0.7 mm and wherein the third and fourth surfaces respectively have compressive stress values such that the fourth surface has as compressive stress value that is greater than the compressive stress value of the third surface.

In a second embodiment, this disclosure provides the laminate of the first embodiment, wherein the complexly-curved glass substrate has a thickness in the range of about 0.2 mm to about 0.7 mm is a chemically strengthened glass.

In a third embodiment, this disclosure provides the laminate of any one or both the first embodiment and the second embodiment, wherein the first complexly-curved glass substrate has a thickness in the range of about 1.4 mm to about 3.85 mm, and the second complexly-curved glass substrate has a thickness in the range of about 0.2 mm to about 0.7 mm.

In a fourth embodiment, this disclosure provides the laminate of any of the first through third embodiments, wherein the first complexly-curved glass substrate is made of soda lime glass.

In a fifth embodiment, this disclosure provides the laminate of any of the first through fourth embodiments, wherein the intervening polymer interlayer is selected from the group consisting of polyvinyl butyral, ethylenevinylacetate, ionomers, polyvinyl chloride copolymers and thermoplastic polyurethane.

In a sixth embodiment, this disclosure provides the laminate of any of the first through fifth embodiments, wherein a peripheral portion of the second complexly-curved glass substrate exerts a compressive force against the polymer interlayer, and a center portion of the second complexly-curved glass substrate exerts a tensile force against the polymer interlayer.

In a seventh embodiment, this disclosure provides the laminate of any of the first through sixth embodiments, further comprising a uniform distance between the second surface and the third surface.

In an eight embodiment, this disclosure provides the laminate of any of the first through seventh embodiments, wherein the laminate exhibits a radii of curvature, wherein the radii of curvature are less than 1000 mm.

In a ninth embodiment, this disclosure provides a vehicle comprising: a body; an opening in the body; and a laminate disposed in the opening, wherein the laminate comprises a first complexly-curved glass substrate having a first surface, a second surface opposite the first surface, and a first thickness therebetween; a second complexly-curved glass substrate having a third surface, a fourth surface opposite the third surface, and a second thickness therebetween; and a polymer interlayer affixed to the second surface and third surface, wherein one of the first thickness and the second thickness is in the range of about 0.2 mm to about 0.7 mm and wherein the third and fourth surfaces respectively have compressive stress values such that the fourth surface has as compressive stress value that is greater than the compressive stress value of the third surface.

In a tenth embodiment, this disclosure provides a vehicle of the ninth embodiment wherein the laminate is moveable with respect to the opening.

In an eleventh embodiment, this disclosure provides the vehicle of any one or both the ninth embodiment and the tenth embodiment, wherein the first complexly curved substrate comprises a soda lime glass composition and a thickness of greater than about 0.7 mm and the second complexly curved substrate comprises a strengthened glass and has a thickness in the range from about 0.2 mm to about 0.7 mm.

In a twelfth embodiment, this disclosure provides a method of producing a complexly curved laminate, comprising: placing an interlayer between a first complexly curved substrate and a flat second glass substrate to form a stack; applying pressure to the stack to press the second glass substrate against the interlayer and the first complexly curved substrate to from the complexly curved laminate; and heating the complexly curved laminate to a temperature below 400° C.

In a thirteenth embodiment, this disclosure provides a method of the twelfth embodiment, wherein the first complexly curved substrate is made of metal, ceramic, plastic or glass.

In a fourteenth embodiment, this disclosure provides a method of any one or both the twelfth and thirteenth embodiments, wherein the flat second glass substrate comprises a thickness in the range of about 0.2 mm to about 0.7 mm, and the first complexly curved substrate comprises a thickness greater than 0.7 mm.

In a fifteenth embodiment, this disclosure provides a method of any one of the twelfth through fourteenth embodiments, wherein the pressure is at about 1 atmosphere or greater.

In a sixteenth embodiment, this disclosure provides a method of any one of the twelfth through fifteenth embodiments, wherein pressure is applied to the stack using a vacuum technique.

In a seventeenth embodiment, this disclosure provides a method of any one of the twelfth through sixteenth embodiments, wherein the pressure is applied to the stack at room temperature.

In a eighteenth embodiment, this disclosure provides a method of any one of the twelfth through seventeenth embodiments, wherein the laminate is heated to a temperature in the range of about 100° C. to about 140° C. to form a finished bond between the bonding layer and complexly curved glass substrates.

In a nineteenth embodiment, this disclosure provides a complexly curved laminate formed by the method of any one of the twelfth through eighteenth embodiments.

In twentieth embodiment, this disclosure provides a method of producing a complexly-curved laminate, comprising: forming a first glass substrate having two major surfaces and a thickness therebetween to have a curvature along two axes and to provide a complexly curved glass substrate; arranging the complexly curved glass substrate with an interlayer and a second glass substrate in a stack such that the interlayer is between the complexly curved glass substrate and the second glass substrate, wherein the second glass substrate has two major surfaces and a thickness therebetween to have a curvature along two axes, wherein the curvature of the second glass substrate does not match the curvature of the first glass substrate; and applying pressure to the stack at room temperature, wherein the curvature of the second glass substrate conforms to the curvature of the first glass substrate to form a complexly curved laminate.

In a twenty-first embodiment, this disclosure provides a method of the twentieth embodiment, which further comprises heating stack to a temperature in the range of about 100° C. to about 140° C. to form a bond between the interlayer and the first and second glass substrates.

In a twenty-second embodiment, this disclosure provides a method of any one or both the twentieth and twenty-first embodiment, wherein the second glass substrate is a chemically strengthened glass having a thickness in the range of about 0.2 mm to about 0.7 mm, and the first glass substrate is a soda lime glass having a thickness in the range of about 1.4 mm to about 3.85 mm.

In a twenty-third embodiment, this disclosure provides a complexly curved laminate formed by the method of any one of the twentieth through twenty-second embodiments.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:
1. A laminate comprising:
a first complexly-curved glass substrate having a first surface, a second surface opposite the first surface, and a first thickness therebetween;
a second complexly-curved glass substrate having a third surface, a fourth surface opposite the third surface, and a second thickness therebetween; and
a polymer interlayer affixed to the second surface and third surface,
wherein one of the first thickness and the second thickness is in the range of about 0.2 mm to about 0.7 mm and wherein the third and fourth surfaces respectively have compressive stress values such that the fourth surface has as compressive stress value that is greater than the compressive stress value of the third surface.

2. The laminate of claim 1, wherein the complexly-curved glass substrate having a thickness in the range of about 0.2 mm to about 0.7 mm is a chemically strengthened glass.

3. The laminate of claim 1, wherein the first complexly-curved glass substrate has a thickness in the range of about 1.4 mm to about 3.85 mm, and the second complexly-curved glass substrate has a thickness in the range of about 0.2 mm to about 0.7 mm.

4. The laminate of claim 1, wherein the first complexly-curved glass substrate is made of soda lime glass.

5. The laminate of claim 1, wherein the intervening polymer interlayer is selected from the group consisting of polyvinyl butyral, ethylenevinylacetate, ionomers, polyvinyl chloride copolymers and thermoplastic polyurethane.

6. The laminate of claim 1, wherein a peripheral portion of the second complexly-curved glass substrate exerts a compressive force against the polymer interlayer, and a center portion of the second complexly-curved glass substrate exerts a tensile force against the polymer interlayer.

7. The laminate of claim 1, further comprising a uniform distance between the second surface and the third surface.

8. The laminate of claim 1, wherein the laminate exhibits a radii of curvature, wherein the radii of curvature are less than 1000 mm.

* * * * *